US010769472B2

United States Patent
Dwivedi et al.

(10) Patent No.: US 10,769,472 B2
(45) Date of Patent: Sep. 8, 2020

(54) METHOD AND SYSTEM COUNTING PLURALITY OF OBJECTS PLACED IN A REGION

(71) Applicant: WIPRO LIMITED, Bangalore (IN)

(72) Inventors: Gyanesh Dwivedi, Bangalore (IN); Vinod Pathangay, Bangalore (IN)

(73) Assignee: Wipro Limited, Bangalore (IN)

( * ) Notice: Subject to any disclaimer, the term of this patent is extended or adjusted under 35 U.S.C. 154(b) by 283 days.

(21) Appl. No.: 15/938,970

(22) Filed: Mar. 28, 2018

(65) Prior Publication Data

US 2019/0303699 A1    Oct. 3, 2019

(30) Foreign Application Priority Data

Mar. 28, 2018   (IN) .............................. 201841011737

(51) Int. Cl.
*G06K 9/32* (2006.01)
*G06T 7/11* (2017.01)
*G06T 7/50* (2017.01)
*G06K 9/62* (2006.01)

(52) U.S. Cl.
CPC ......... *G06K 9/3241* (2013.01); *G06K 9/6212* (2013.01); *G06T 7/11* (2017.01); *G06T 7/50* (2017.01); *G06T 2207/30242* (2013.01)

(58) Field of Classification Search
CPC .............. G06K 9/3241; G06K 9/6212; G06K 9/00664; G06T 7/50; G06T 7/11; G06T 2207/30242

See application file for complete search history.

(56) References Cited

U.S. PATENT DOCUMENTS

| 6,859,555 B1 | 2/2005 | Fang et al. |
| 2011/0033021 A1* | 2/2011 | Freriks .................... G06M 9/00 377/8 |

(Continued)

FOREIGN PATENT DOCUMENTS

| CN | 202257664 | 5/2012 |
| CN | 204631922 | 9/2015 |

OTHER PUBLICATIONS

Ghazali, M., et al., "Automatic Detection and Counting of Circular and Rectangular Steel Bars", *SpringLink*, (2016), pp. 199-207.

(Continued)

*Primary Examiner* — Bobbak Safaipour
(74) *Attorney, Agent, or Firm* — Finnegan, Henderson, Farabow, Garrett & Dunner, LLP (57) ABSTRACT

Disclosed herein is a method and system for counting plurality of objects placed in a region. An image of the region is captured and partitioned into segments based on depth of the plurality of objects. Further, shape of each of the plurality of objects in each object region of each segment is determined and validated based on comparison of the determined shape with predetermined shapes. Finally, count of the plurality of objects of each shape is aggregated for determining count of the plurality of objects in the region. In an embodiment, the present disclosure helps in automatically recognizing and counting the plurality of objects of multiple dimensions and multiple shapes, even when the image of the region includes a distorted/unfavorable background.

11 Claims, 8 Drawing Sheets

(56) References Cited

U.S. PATENT DOCUMENTS

| | | | |
|---|---|---|---|
| 2013/0144568 A1* | 6/2013 | Palma-Amestoy | ............................ G01N 33/1826 703/1 |
| 2016/0371634 A1* | 12/2016 | Kumar | .................. G06K 9/6212 |
| 2017/0235983 A1* | 8/2017 | Alwesh | ................... G06F 17/00 235/385 |
| 2019/0308320 A1* | 10/2019 | Konishi | ............. G06K 9/00208 |
| 2020/0051272 A1* | 2/2020 | Mukherjee | .............. G06T 7/155 |

OTHER PUBLICATIONS

Yu, Z., et al., "Detecting circular and rectangular particles based on geometric, feature detection in electron micrographs", *Elsevier, Journal of Structural Biology,* vol. 145, (2004), pp. 168-180.

\* cited by examiner

METHOD AND SYSTEM COUNTING PLURALITY OF OBJECTS PLACED IN A REGION

TECHNICAL FIELD

The present subject matter is, in general, related to image analysis and more particularly, but not exclusively, to a method and system for counting plurality of objects placed in a region by means of image processing techniques.

BACKGROUND

Presently, in most of large-scale factories and warehouses, counting number of objects such as goods, raw materials and the like, lying at manufacturing units or at distribution units has become a major problem, as manual counting of the objects consumes a lot of time, and is a labor-intensive process which is prone to manual errors. In some instances, it may be required that the objects that are being loaded onto or being unloaded from a carrying vehicle like truck, need to be counted before and/or after transportation. Additionally, for verification and auditing purposes, it may also be required to count the number of objects at both ends of the transportation, i.e., where the objects are being loaded and where the objects are getting unloaded. However, the manual counting process is a very tedious and error-prone task, due to which overall transportation time may be increased.

The existing methods for automatically counting the number of objects placed in a location include analyzing an image of the location/objects and then returning a count of the objects identified in the image. However, the existing methods may return a wrong count of the objects when the objects are present in a cluttered or a distorted background. Further, the existing methods fail to take accurate count of the objects in a location, when the objects are partially visible in the image due to occlusion or incomplete image coverage, or when ends of multiple objects appear to be merged in the image due to shadow or unfavorable lighting conditions. Hence, counting the number of distinct objects accurately in such scenarios may be extremely difficult.

The information disclosed in this background of the disclosure section is only for enhancement of understanding of the general background of the invention and should not be taken as an acknowledgement or any form of suggestion that this information forms the prior art already known to a person skilled in the art.

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method for counting plurality of objects placed in a region. The method comprises partitioning, by an object counting system, an image of the region, comprising the plurality of objects, into one or more segments based on depth of each of the plurality of objects. The image of the region is received from an image capturing unit associated with the object counting system. Further, the method comprises identifying one or more object regions in each of the one or more segments. Upon identifying the one or more object regions, the method comprises determining shape of each of the plurality of objects in each of the one or more object regions of each of the one or more segments. Further, the method comprises validating the shape of each of the plurality of objects based on comparison of the shape of each of the plurality of objects with predetermined shapes. Finally, the method comprises aggregating count of the plurality of objects of each shape in each of the one or more segments for determining count of the plurality of objects in the region.

Further, the present disclosure relates to an object counting system for counting plurality of objects placed in a region. The object counting system comprises a processor and a memory. The memory is communicatively coupled to the processor and stores processor-executable instructions, which on execution cause the processor to partition an image of the region, comprising the plurality of objects, into one or more segments based on depth of each of the plurality of objects. The image of the region is received from an image capturing unit associated with the object counting system. Further, the instructions cause the processor to identify one or more object regions in each of the one or more segments. Upon identifying the one or more object regions, the instructions cause the processor to determine shape of each of the plurality of objects in each of the one or more object regions of each of the one or more segments. Furthermore, the instructions cause the processor to validate the shape of each of the plurality of objects based on comparison of the shape of each of the plurality of objects with predetermined shapes. Finally, the instructions cause the processor to aggregate count of the plurality of objects of each shape in each of the one or more segments to determine count of the plurality of objects in the region.

Furthermore, the present disclosure includes a non-transitory computer readable medium including instructions stored thereon that when processed by at least one processor cause an object counting system to perform operations including partitioning an image of the region, comprising the plurality of objects, into one or more segments based on depth of each of the plurality of objects. The image of the region is received from an image capturing unit associated with the object counting system. Further, the instructions cause the processor to identify one or more object regions in each of the one or more segments. Upon identifying the one or more object regions, the instructions cause the processor to determine shape of each of the plurality of objects in each of the one or more object regions of each of the one or more segments. Further, the instructions cause the processor to validate the shape of each of the plurality of objects based on comparison of the shape of each of the plurality of objects with predetermined shapes. Finally, the instructions cause the processor to aggregate count of the plurality of objects of each shape in each of the one or more segments for determining count of the plurality of objects in the region.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and an object counting system for counting plurality of objects placed in a region. In an embodiment, the method of present disclosure may be capable of identifying and counting distinct, multi-dimensional, and varied shaped objects from a distorted background by capturing an image of a region in which the plurality of objects to be counted are placed. Further, the method of present disclosure may also be capable of determining the count of the plurality of objects which are placed at different and/or non-uniform depth levels in the region.

In an embodiment, the present disclosure includes partitioning the image of the plurality of objects into one or more segments based on depth of the plurality of objects. Subsequently, each of the one or more segments may be analyzed to identify one or more object regions and one or more non-object regions. Further, each of the one or more object regions may be processed for determining shape of each of the plurality of objects present in the one or more object regions. Thereafter, a pre-trained machine learning technique may be used to validate the determined shape of each of the plurality of objects by comparing the shape of each of the plurality of objects with one or more predetermined shapes. Upon validating the shape of each of the plurality of objects, the count of the plurality of objects in the region may be computed as an aggregate of the count of each object belonging to each of the shape types.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
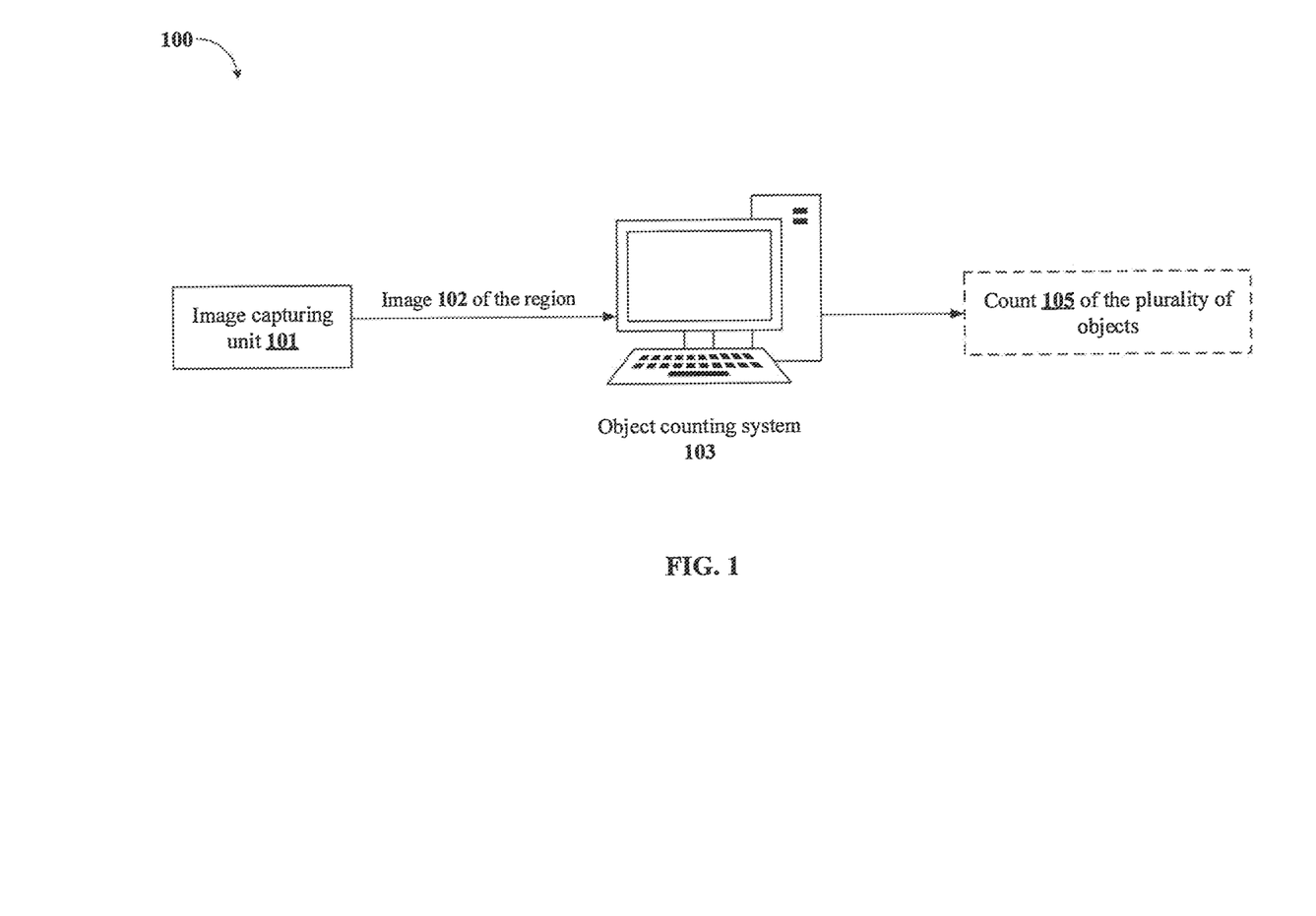
FIG. 1 illustrates an exemplary environment for counting plurality of objects placed in a region in accordance with some embodiments of the present disclosure.

FIG. 1 illustrates an exemplary environment 100 for counting plurality of objects placed in a region in accordance with some embodiments of the present disclosure.

In an embodiment, the environment 100 may include an object counting system 103 and an image capturing unit 101. In an implementation, the object counting system 103 may be a computing device such as a smartphone, a desktop, a laptop, a Personal Digital Assistant (PDA) and the like, which may be configured to count plurality of objects placed in a region by analyzing and processing an image 102 of the plurality of objects placed in the region. Alternatively, the object counting system 103 may be used as an application integrated in any of the computing devices stated above.

In an embodiment, the image capturing unit 101 may be a digital camera. Alternatively, a smartphone having an embedded digital camera may also be used for capturing the image 102 of the region. In some implementations, the image capturing unit 101 may include an array of multiple image capturing sensors, each consisting of a conventional Red Green Blue (RGB) sensor, and a depth/range sensor that may estimate depth values of the plurality of objects. Further, the depth sensor may be aligned with the RGB sensors, such that, for each pixel of the image 102 captured by the RGB sensor, there is an associated depth value estimated from the depth sensor.

In an embodiment, before transmitting the image 102 to the object counting system 103, the image capturing unit 101 may analyze the captured image 102 to verify whether the captured image 102 covers each of the plurality of objects placed in the region, as a single image 102 of the region might not cover each of the plurality of objects placed in the region. In an embodiment, when the image capturing unit 101 detects that a complete image 102 of the region has not been captured, the image capturing unit 101 may dynamically activate an assistive panorama image capturing mechanism. The assistive panorama image capturing mechanism may provide feedback to user, indicating the user to move the image capturing unit 101 in a direction of the one or more objects which are not covered in the already captured image 102.

In other words, after capturing the image 102 of the region, the image capturing unit 101 may verify whether each of the plurality of objects are within a predefined boundary in the image 102. Suppose, if one or more of the plurality of objects are detected to be outside the predefined boundary, then the image capturing unit 101 may capture one or more additional images of the region to ensure that each of the plurality of objects placed in the region are covered in the image 102. Further, upon capturing the one or more additional images, the image capturing unit 101 may combine/merge each of the one or more additional images into a single image 102 of the region, which may be subsequently transmitted to the object counting system 103 for further processing.

In some implementations, the image capturing unit 101 may capture the image 102 of the region (i.e. the image 102 and the one or more additional images, when required) in a field-of-view at a predefined rate, for example at a rate of 5 to 30 frames per second. The rate at which the image capturing unit 101 captures the image 102 of the region may be dynamically set by a user while capturing the image 102 of the region. In some implementations, the image capturing unit 101 and the object counting system 103 may be embedded within a single computing device such as a smartphone. Alternatively, the object counting system 103 may be located at a remote location, wherein the image capturing unit 101 captures the image 102 of the region and transmits the captured image 102 to the object counting system 103 over a wired and/or a wireless communication network.

In an embodiment, upon receiving the image 102 of the region, the object counting system 103 may partition the image 102 into one or more segments based on the depth of each of the plurality of objects in the image 102. Further, the object counting system 103 may identify one or more object regions within each of the one or more segments by analyzing the image 102 using a pre-trained machine learning classifier, which classifies each region within each of the one or more segments as the one or more object regions and one or more non-object regions. The one or more object regions may be the regions which comprise one or more of the plurality of objects. Similarly, the one or more non-object regions are the regions that do not comprise any of the plurality of objects. In an embodiment, the object counting system 103 may eliminate the one or more non-object regions from further processing, in order to enhance speed of the object counting process.

In an embodiment, upon identifying the one or more object regions, the object counting system 103 may determine shape of each of the plurality of objects in each of the one or more object regions based on one or more shape-specific parameters from each of the one or more regions. As an example, the shape of the plurality of objects may be circular, rectangular, polygonal and the like. Similarly, the one or more shape-specific parameters associated with the shape may include, without limiting to, radius of the shape (when the object is in circular shape), or length of sides/diagonals (when the object is in polygonal shape).

In an embodiment, upon determining the shape of each of the plurality of objects, the object counting system 103 may validate the shape of each of the plurality of objects by comparing the shape of each of the plurality of objects with predetermined shapes. The predetermined shapes may include each of one or more shapes/forms in which the plurality of objects may be present in the region. As an example, the predetermined shapes may be circular, spherical, cylindrical, polygonal and the like.

In an embodiment, upon validating the shape of each of the plurality of objects, the object counting system 103 may compute count of the one or more objects of each shape in each of the one or more object regions, and subsequently may aggregate the count of each of the plurality of objects of each shape for determining the count 105 of the plurality of objects in the region. In an embodiment, upon determining the count 105 of the plurality of objects, the object counting system 103 may display/notify the count 105 of the plurality of objects to the user through a user interface associated with the user device and/or the object counting system 103.

Figure 2:
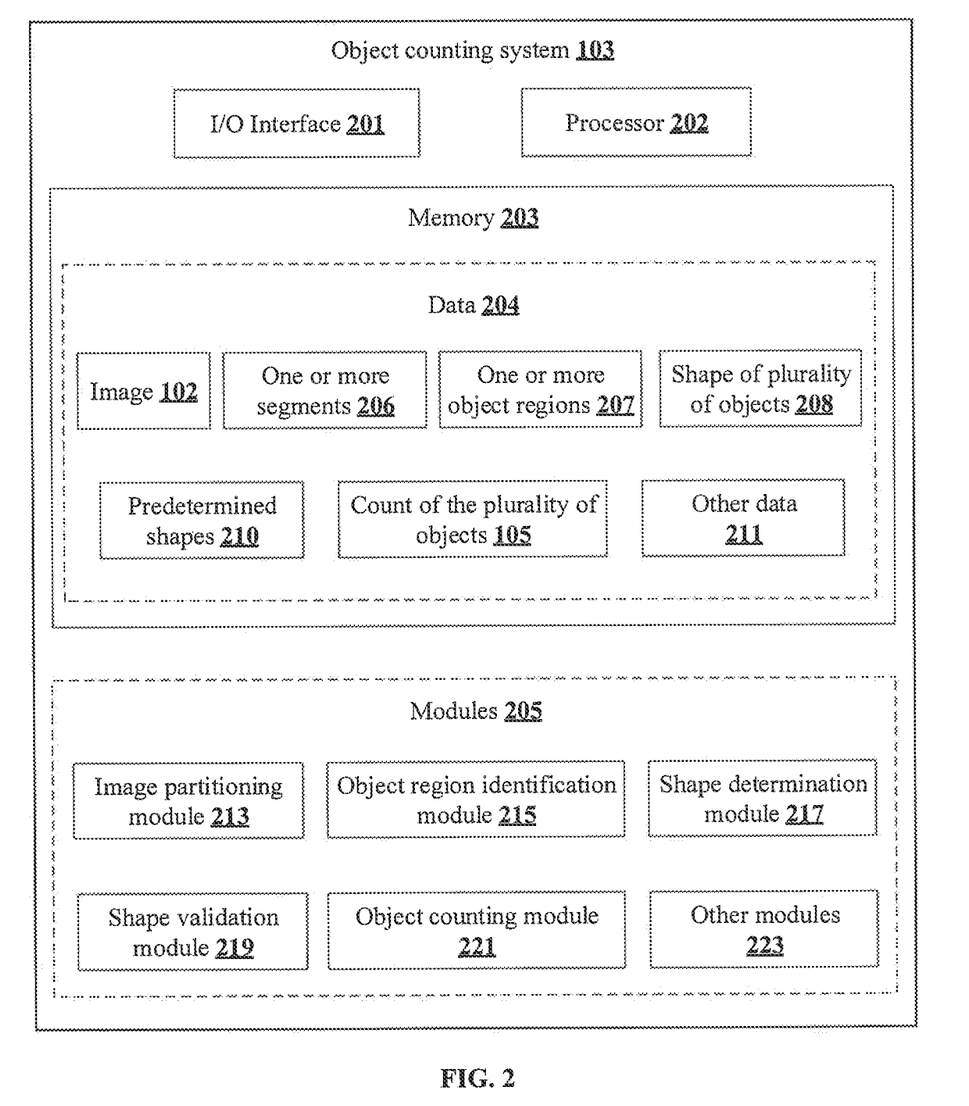
FIG. 2 shows a detailed block diagram illustrating an object counting system in accordance with some embodiments of the present disclosure.

FIG. 2 shows a detailed block diagram illustrating an object counting system 103 in accordance with some embodiments of the present disclosure.

In an implementation, the object counting system 103 may include an I/O interface 201, a processor 202, and a memory 203. The I/O interface 201 may be configured to communicate with an image capturing unit 101 associated with the object counting system 103 for receiving an image 102 of a region having plurality of objects to be counted. Further, the I/O interface 201 may be configured for providing the count 105 of the plurality of objects in the region to a user, through a user interface associated with the user device or the object counting system 103. The processor 202 may be configured to perform one or more functions of the object counting system 103 while counting the plurality of objects in the image 102. The memory 203 may be communicatively coupled to the processor 202.

In some implementations, the object counting system 103 may include data 204 and modules 205 for performing various operations in accordance with embodiments of the present disclosure. In an embodiment, the data 204 may be stored within the memory 203 and may include information related to, without limiting to, the image 102, one or more segments 206, one or more object regions 207, shape of plurality of objects 208 (hereinafter referred to as shape 208), predetermined shapes 210, count of the plurality of objects 105 (hereinafter referred to as count 105), and other data 211.

In some embodiments, the data 204 may be stored within the memory 203 in the form of various data structures. Additionally, the data 204 may be organized using data models, such as relational or hierarchical data models. The other data 211 may store various data, including spatial frequencies of the one or more object regions 207, probability score associated with each shape 208, pixel area and pixel indices related to space occupied by the plurality of objects, value of a Mutual Shape Co-occurrence Factor (MSCF), and other temporary data and files generated by one or more modules 205 for performing various functions of the object counting system 103.

In an embodiment, the image 102 of the region may be captured by the image capturing unit 101 associated with the object counting system 103, and may indicate position/arrangement, shape, color of each of the plurality of objects in the region. As an example, the image 102 may be in various forms including, but not limiting to, a colored image, a black and white image or a monochrome image.

In an embodiment, the one or more segments 206 may be obtained by partitioning the image 102 based on depth of the plurality of objects in the region. Partitioning the image 102 into the one or more segments 206 may help in distinctly identifying each of the plurality of objects of each depth.

In an embodiment, the one or more object regions 207 may be identified in each of the one or more segments 206 by detecting the plurality of objects in each of the one or more segments 206 using a pre-trained machine learning classifier configured in the object counting system 103. Upon detecting the plurality of objects, the machine learning classifier may classify each region within each of the one or more segments 206 as one or more object regions 207 and one or more non-object regions. Subsequently, each of the one or more object regions 207 may be taken for further processing as each of the one or more object regions 207 indicate presence of the one or more objects in the one or more segments 206 of the image 102.

In an embodiment, the shape 208 of the plurality of objects may be physical appearance and/or outline of the plurality of objects in the region. As an example, the shape 208 of the plurality of objects may include, but not limiting to, circular, rectangular, polygonal and the like. The shape 208 may be determined based on one or more shape-specific parameters extracted from each of the one or more object regions 207. For example, the one or more shape-specific parameters associated with the shape 208 may include, without limiting to, radius of the shape 208 (when the object is in a circular shape), or length of sides/diagonals (when the object is in a polygonal shape).

In an embodiment, the predetermined shapes 210 may include, each of one or more shapes/forms in which the plurality of objects may be present in the region. As an example, the predetermined shapes 210 may be circular, spherical, cylindrical, polygonal and the like. The predetermined shapes 210 may be used for validating the shape 208 of each of the plurality of objects in each of the one or more object regions 207.

In an embodiment, the count 105 of the plurality of objects may be obtained by aggregating the count 105 of the plurality of objects of each shape 208 in each of the one or more segments 206. In other words, the count 105 of the plurality of objects in the region may be equal to sum of the total number of objects of each shape 208 in each of the one or more segments 206.

In an embodiment, each of the data 204 stored in the object counting system 103 may be processed by one or more modules 205 of the object counting system 103. In one implementation, the one or more modules 205 may be stored as a part of the processor 202. In another implementation, the one or more modules 205 may be communicatively coupled to the processor 202 for performing one or more functions of the object counting system 103. The modules 205 may include, without limiting to, an image partitioning module 213, an object region identification module 215, a shape determination module 217, a shape validation module 219, an object counting module 221 and other modules 223.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 223 may be used to perform various miscellaneous functionalities of the object counting system 103. It will be appreciated that such modules 205 may be represented as a single module or a combination of different modules.

In an embodiment, the image partitioning module 213 may be used for partitioning the image 102 of the region into one or more segments 206. The image partitioning module 213 may partition the image 102 based on depth of each of the plurality of objects in the image 102. In an embodiment, the image 102 received from the image capturing unit 101 may consist of an RGB frame and a depth frame, which is augmented with color pixel values in the RGB frame. Thus, upon receiving the image 102, the image partitioning module 213 may extract depth values from each depth frames and may store the depth values into a number of containers of different depth values for detecting the depth of each of the plurality of objects. Thereafter, one or more segments 206 of the image 102 may be generated according to the depth values stored in each of the containers, by suppressing all pixel values, corresponding to depth values lying outside the containers, into zeros. Thus, at the end of partitioning, there may be one or more segments 206 in each depth level, wherein each of the one or more segments 206 comprise one or more objects belonging to the same depth level. In an embodiment, partitioning the image 102 based on the depth of the plurality of objects may ensure that none of the plurality of objects remain undetected during the counting process, even when the plurality of objects is placed at varied depths in the region.

In an embodiment, the object region identification module 215 may be used for identifying one or more object regions 207 in each of the one or more segments 206 of the image 102. In some implementations, the object region identification module 215 may be configured with a pre-trained machine learning classifier which may be capable of detecting one or more objects in each of the one or more segments 206. In an embodiment, for each of the one or more segments 206 of the image 102, the object region identification module 215 may iteratively scan entire region of each of the one or more segments 206 by considering one overlapping window of the one or more segments 206 at each iteration. Further, for each window position, the object identification module may apply the pre-trained machine learning classifier to classify the window as one of the object region or the non-object region.

Figure 3A:
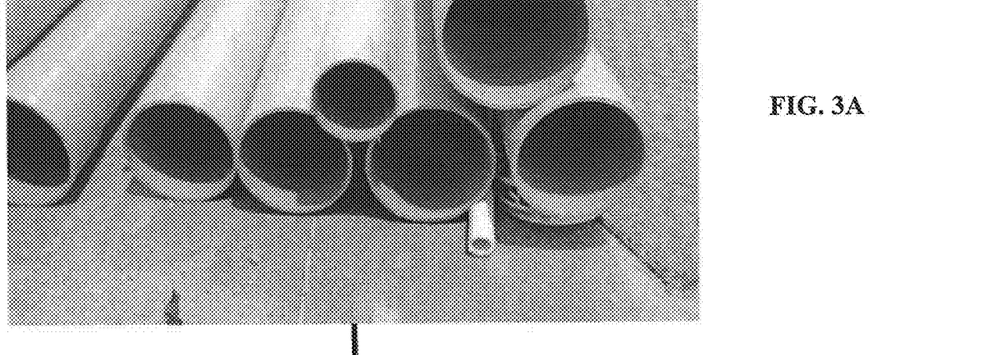
FIGS. 3A-3I illustrate schematic representations indicating an exemplary counting process of objects placed in a region in accordance with the present disclosure.
Figure 3B:
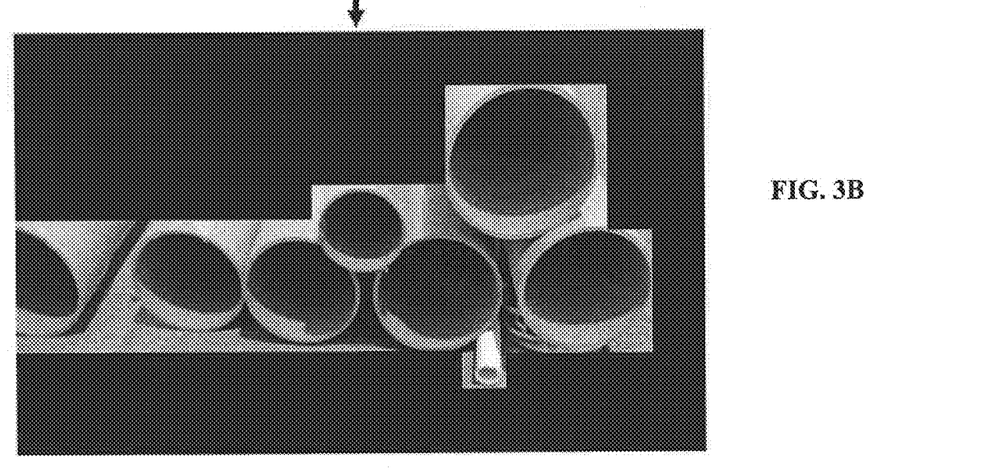

For example, consider the image shown in FIG. 3A, which is an image 102 of plurality of pipes arranged in storehouse. Now, when the image 102 is given as an input to the object region identification module 215 for identifying one or more pipe regions in the image 102, the object region identification module 215 may identify each of the plurality of pipes in the image 102 and extract a region of pipes from the image 102 as shown in FIG. 3B. Further, each of the non-pipe region may be eliminated, thereby extracting only the region of pipes (as indicated in FIG. 3B) for further processing by the object counting system 103. In an embodiment, one or more of the plurality of pipes, whose frontal-face are not covered/recognized in the image 102 may be excluded from the region of pipes.

In an embodiment, the shape determination module 217 may be used for determining the shape 208 of each of the plurality of objects in each of the one or more object regions 207 of each of the one or more segments 206. The shape determination module 217 may analyze each of the one or more object regions 207 for obtaining spatial frequencies of each of the one or more object regions 207 comprising the plurality of objects. Thereafter, the shape determination module 217 may generate a magnitude spectrum histogram of the spatial frequencies of each of the one or more object regions 207. Further, the shape determination module 217 may determine a peak value of the magnitude spectrum histogram, which corresponds to one or more shape-specific parameters associated with the shapes 208. Thereafter, the peak value of the magnitude spectrum histogram may be multiplied with a predetermined scaling factor for obtaining pixel coordinates corresponding to the plurality of objects. As an example, the one or more shape-specific parameters may include, without limiting to, parameters such as radius of the shape 208 (when the object is in circular shape), or length of sides/diagonals (when the object is in polygonal shape), and the like. The predetermined scaling factor may correspond to values of the shape-specific parameters.

Figure 3C:
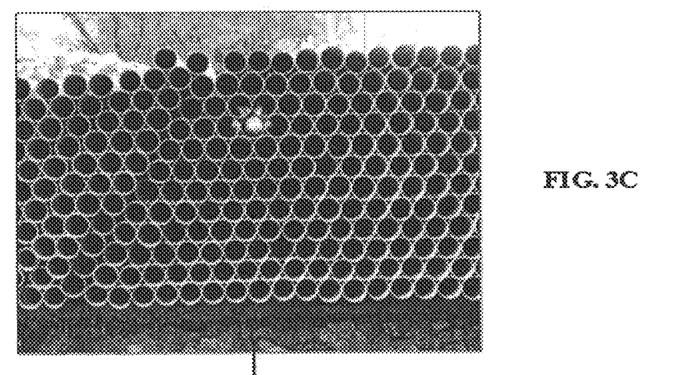

In an embodiment, upon identifying the one or more shape-specific parameters, the shape determination module 217 may perform detection of shapes of each of the one or more object regions 207 by analyzing each of the one or more shape-specific parameters using a predetermined feature extraction technique such as Hough transform algorithm configured in the shape determination module 217. As an example, when an input image 102 such as FIG. 3C is given as an input to the shape determination module 217, the shape detection performed by the shape determination module 217 may be as shown in FIG. 3D, wherein each of the one or more object regions 207 that correspond to circular object shapes (i.e. pipes) of a predetermined scaling factor are indicated as highlighted.

In an embodiment, the shape validation module 219 may be used for validating the shape 208 of each of the plurality of objects based on comparison of the shape 208 of each of the plurality of objects with predetermined shapes 210. The shape validation module 219 may assign a probability score for the shape 208 of each of the plurality of objects by comparing each raw detection of the shapes with the predetermined shapes 210. Further, the shape 208 of each of the plurality of objects may be considered to be valid when the probability score of the shape 208 is higher than a threshold probability score. As an example, the threshold probability score may be 0.80, which means that the shape 208 may be considered to be valid when the probability score of the shape 208 is higher than 0.80.

Figure 3D:
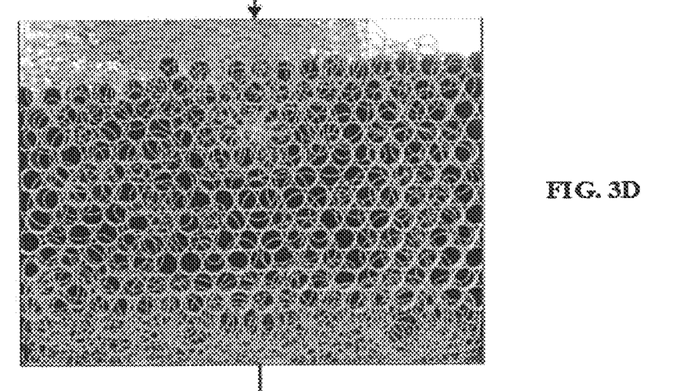
Figure 3E:
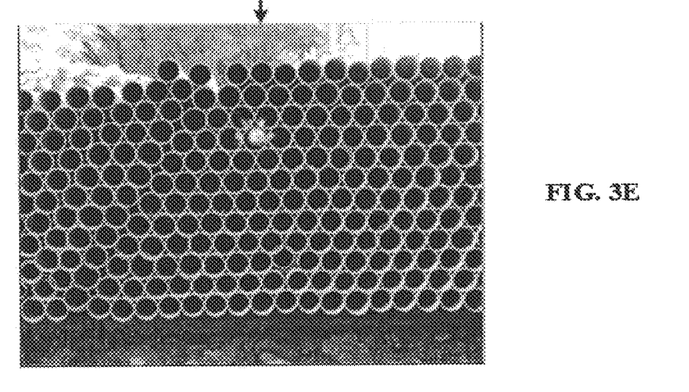

In an embodiment, when the raw detections of shapes, such as the detections shown in FIG. 3D are given to the shape validation module 219, the shape validation module 219 may compute a probability score for each raw detection of the shapes, i.e., for each circle detected in FIG. 3D, and may compare the probability scores with the threshold probability score for validating the shapes 208. Finally, upon validation, only those raw detections of shapes whose probability score is higher than the threshold probability score may be considered valid and retained for counting, as shown in FIG. 3E.

Figure 3F:
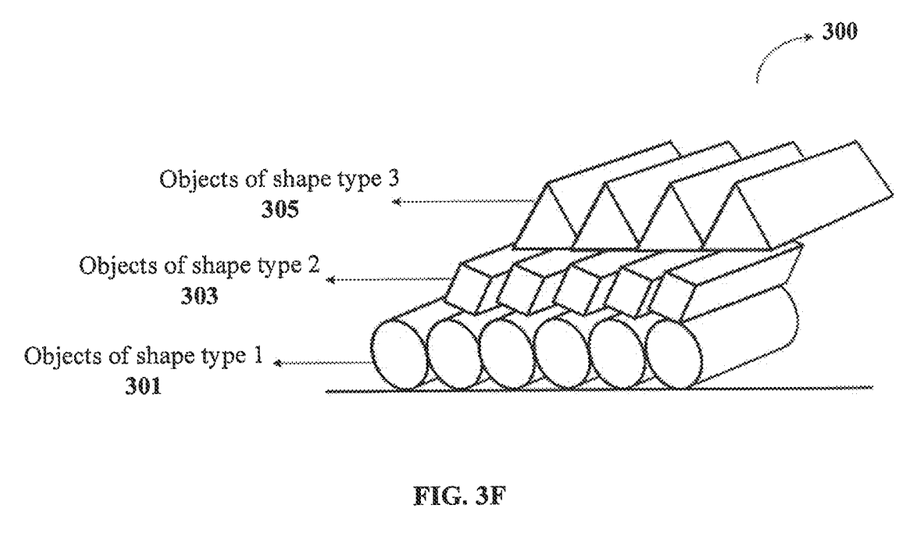

In an embodiment, the object counting module 221 may be used for counting the plurality of objects of each shape 208 in each of the one or more segments 206 for determining the count of the plurality of objects in the region. In an embodiment, when the image 102 comprises one or more objects of varied shapes, the object counting module 221 may initially count the number of objects belonging to each shape type, and then count 105 the plurality of objects in the region as an aggregate of the count of number of objects of varied shape types. As an example, consider a plurality of objects of different shape types namely, objects of shape of type 1 301 (circular objects), objects of shape type 2 303 (square shaped objects) and objects of shape type 3 305 (triangular objects) arranged in an object region 300, as shown in FIG. 3F. In an embodiment, upon detecting and validating the shape 208 of each of the plurality of objects in FIG. 3F, the object counting module 221 may compute an individual count of the objects belonging to each shape type before computing the aggregate count 105 of all the objects present in the object region 300 as following:

Count of objects belonging to shape type 1=6

Count of objects belonging to shape type 2=5

Count of objects belonging to shape type 3=4

Thereafter, the object counting module 221 may aggregate the count of objects of each shape type to determine the count 105 of all the objects present in the object region 300 as following:

Count 105 of objects in object region 300 =
Count of objects of shape type 1 + Count of objects of shape type 2 +
Count of objects of shape type 3 = 6 + 5 + 4 = 15

In an embodiment, the object counting system 103 may display/notify only the aggregate count 105 of the plurality of objects to a user. Alternatively, the object counting system may display/notify the count of objects of each shape type to the user, along with the aggregate count 105 of the plurality of objects in the object region 300.

In an embodiment, the object counting system 103 may be configured to detect and eliminate one or more overlapping shapes among the shape 208 of each of the plurality of objects, in order to determine an accurate count 105 of the plurality of objects in the region. In an embodiment, the object counting system 103 may identify one or more overlapping shapes when an intersection is detected among pixel indices corresponding to one or more of the plurality of objects in the image 102. Further, the object counting system 103 may compute a Mutual Shape Co-occurrence Factor (MSCF) for each pair in the one or more overlapping shapes based on an image gradient identified for each of the one or more overlapping shapes. Finally, one shape among each pair of the one or more overlapping shapes may be eliminated from the image 102 when value of the MSCF, corresponding to the selected shape, is more than a predefined threshold MSCF.

Figure 3G:
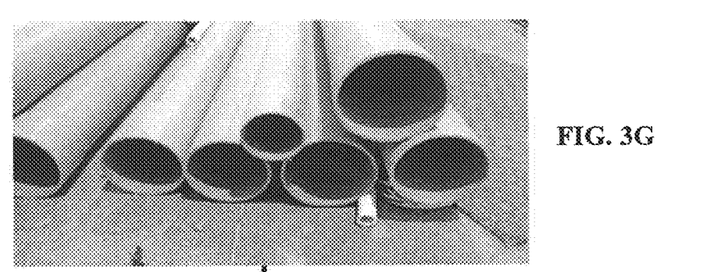
Figure 3H:
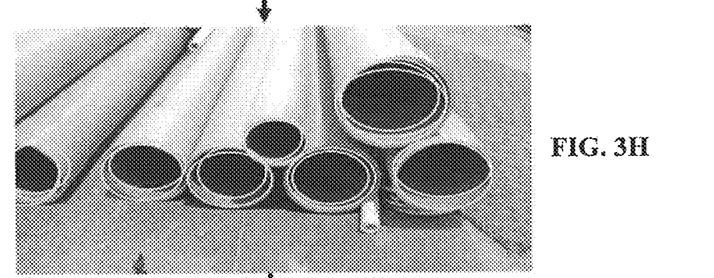
Figure 3I:
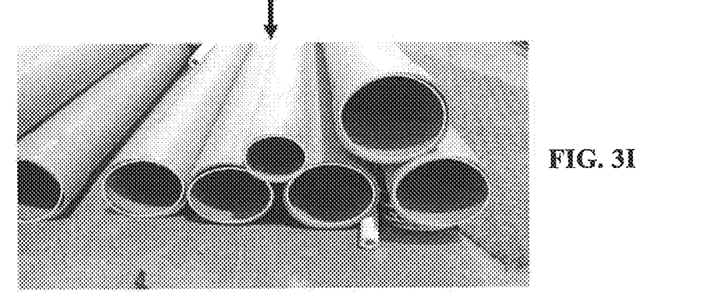

For example, consider the image 102 of a plurality of pipes as shown in FIG. 3G. In an embodiment, the one or more raw detections of shapes corresponding to each of the plurality of pipes in FIG. 3G may include one or more overlapping shape detections as shown FIG. 3H. Consequently, the object counting system 103 may perform detection and elimination of each of the overlapping shape detections using the above method for retaining only non-overlapping shape detections in the image 102, as shown in FIG. 3I. Subsequently, the count 105 of the plurality of pipes in the image 102 may be determined by counting each of the non-overlapping shape detections shown in FIG. 3I.

Figure 4:
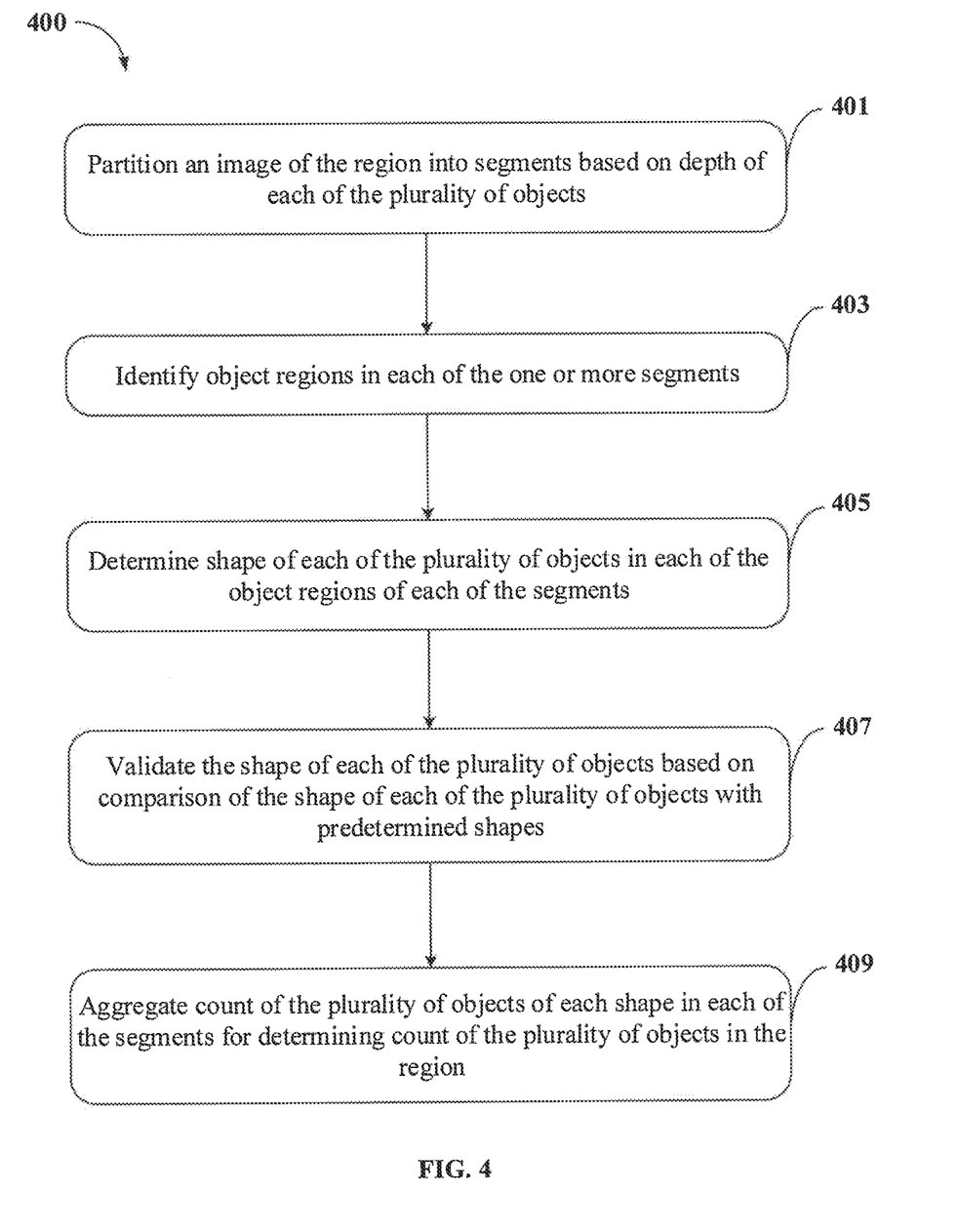
FIG. 4 shows a flowchart illustrating a method of counting plurality of objects placed in a region in accordance with some embodiments of the present disclosure.

FIG. 4 shows a flowchart illustrating a method of counting plurality of objects placed in a region in accordance with some embodiments of the present disclosure.

As illustrated in FIG. 4, the method 400 includes one or more blocks illustrating a method of counting plurality of objects placed in a region, using an object counting system 103 for example, the object counting system 103 shown in FIG. 1. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the method 400 includes partitioning, by the object counting system 103, an image 102 of the region, comprising the plurality of objects, into one or more segments 206 based on depth of each of the plurality of objects. The image 102 of the region may be received from an image capturing unit 101 associated with the object counting system 103. In an embodiment, the depth of each of the plurality of objects in each of the one or more segments 206 may be determined using a depth sensor configured in the image capturing unit 101.

At block 403, the method 400 includes identifying, by the object counting system 103, one or more object regions 207 in each of the one or more segments 206. In an embodiment, the one or more object regions 207 may be identified in each of the one or more segments 206 using a pre-trained machine learning classifier configured in the object counting system 103.

At block 405, the method 400 includes determining, by the object counting system 103, shape 208 of each of the plurality of objects in each of the one or more object regions 207 of each of the one or more segments 206. In an embodiment, the shape 208 of each of the plurality of objects may be determined by obtaining spatial frequencies of each of the one or more object regions 207 comprising the plurality of objects, and generating a magnitude spectrum histogram of the spatial frequencies of each of the one or more object regions 207. Thereafter, a peak value of the magnitude spectrum histogram is associated with a predetermined scaling factor for obtaining pixel coordinates corresponding to the plurality of objects, thereby determining the shape 208 of the plurality of objects.

At block 407, the method 400 includes validating, by the object counting system 103, the shape 208 of each of the plurality of objects based on comparison of the shape 208 of each of the plurality of objects with predetermined shapes 210. In an embodiment, a probability score for the shape 208 of each of the plurality of objects may be assigned based on comparison of the shape 208 of each of the plurality of objects with the predetermined shapes 210. Subsequently, the shape 208 of each of the plurality of objects may be validated when the probability score of the shape 208 is higher than a threshold probability score.

At block 409, the method 400 includes aggregating, by the object counting system 103, count of the plurality of objects of each shape 208 in each of the one or more segments 206 for determining count 105 of the plurality of objects in the region. In an embodiment, the method 400 may further include eliminating overlap in the plurality of objects identified in the one or more object regions 207 in each of the one or more segments 206 before aggregating the count 105 of the plurality of objects.

In an embodiment, pixel indices corresponding to pixel area occupied by each of the plurality of objects may be determined in the one or more object regions 207 for identifying one or more overlapping objects upon when intersection is identified among the pixel indices corresponding to one or more of the plurality of objects. Further, a Mutual Shape Co-occurrence Factor (MSCF) may be computed for each pair in the one or more overlapping objects based on an image gradient identified for each of the one or more overlapping objects. Finally, one object among each pair of the one or more overlapping objects may be selected for eliminating, when value of the MSCF, corresponding to the selected one object, is more than a predefined threshold MSCF.

Computer System

Figure 5:
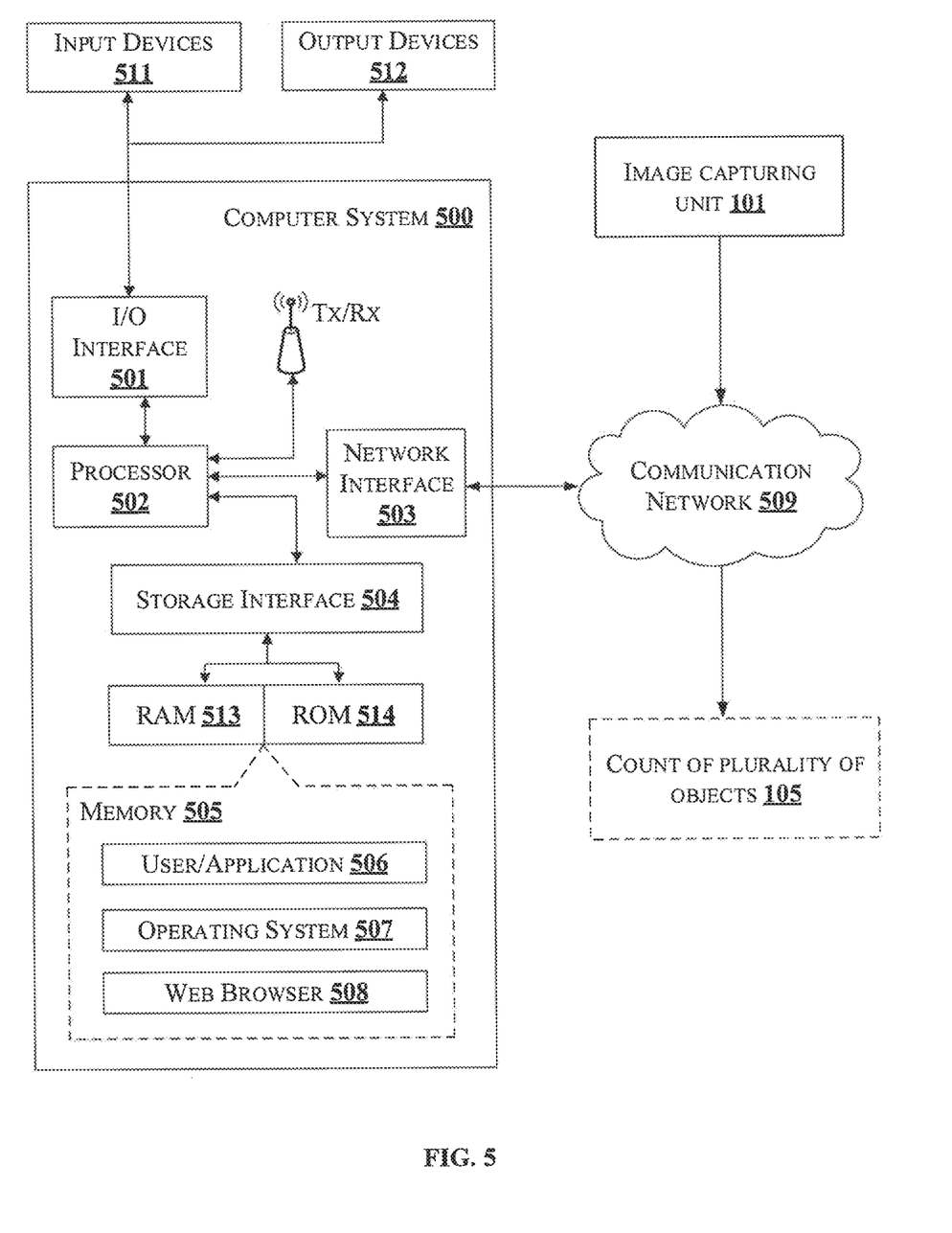
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be object counting system 103 shown in FIG. 1, which may be used for counting the plurality of objects placed in a region. The computer system 500 may include a central processing unit ("CPU" or "processor") 502. The processor 502 may comprise at least one data processor for executing program components for executing user- or system-generated business processes. A user may include a person, a user in the computing environment 100, or any system/sub-system being operated parallelly to the computer system 500. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512. In some implementations, the I/O interface 501 may be used to connect to a user device, such as an image capturing unit 101, a smartphone, a laptop and the like, associated with the user, through which the object counting system 103 may receive the image 102 of the region.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may receive the image 102 from the image capturing unit 101. Similarly, the computer system 500 may use the communication network 509 for notifying the count 105 of the plurality of objects in the image 102 to the user, through the user device or a user interface associated with the user or the object counting system 103.

In an implementation, the communication network 509 can be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application interface 506, an operating system 507, a web browser 508, and the like. In some embodiments, computer system 500 may store user/application data 506, such as the data, variables, records, etc. as described in this invention. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 506 may facilitate display, execution, interaction, manipulation, or operation of program components through textual or graphical facilities. For example, the user interface 506 may provide computer interaction interface elements on a display system operatively connected to the computer system 500, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 508 may be a hypertext viewing application. Secure web browsing may be provided using Secure Hypertext Transport Protocol (HTTPS), Secure Sockets Layer (SSL), Transport Layer Security (TLS), and the like. The web browsers 508 may utilize facilities such as AJAX, DHTML, ADOBE® FLASH®, JAVASCRIPT®, JAVA®, Application Programming Interfaces (APIs), and the like. Further, the computer system 500 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure discloses a method for automatically counting plurality of objects placed in a region, and thus drastically reduces the amount of time required for counting the plurality of objects placed in the region.

In an embodiment, the method of present disclosure is capable of recognizing and counting the plurality of objects of multiple dimensions and of multiple shape types without the need for human intervention.

In an embodiment, the method of present disclosure is capable of effectively recognizing the plurality of objects from an image of the region, even when the image includes disturbances, distortions and/or when the image is captured in shadow/low-lighting conditions.

In an embodiment, the method of present disclosure is capable of determining the count of objects which are arranged at different and/or non-uniform depth levels in a region.

In an embodiment, the method of present disclosure is capable of identifying and eliminating one or more overlapping object/shape detections while counting the plurality of objects, thereby providing an accurate count of the plurality of objects.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Image capturing unit |
| 102 | Image of the region (image) |
| 103 | Object counting system |
| 105 | Count of plurality of objects (count) |
| 201 | I/O interface |
| 202 | Processor |
| 203 | Memory |
| 204 | Data |
| 205 | Modules |
| 206 | One or more segments |
| 207 | One or more object regions |
| 208 | Shape of plurality of objects |
| 210 | Predetermined shapes |
| 211 | Other data |
| 213 | Image partitioning module |
| 215 | Object region identification module |
| 217 | Shape determination module |
| 219 | Shape validation module |
| 221 | Object counting module |
| 223 | Other modules |
| 500 | Exemplary computer system |
| 501 | I/O Interface of the exemplary computer system |
| 502 | Processor of the exemplary computer system |
| 503 | Network interface |
| 504 | Storage interface |
| 505 | Memory of the exemplary computer system |
| 506 | User/Application |
| 507 | Operating system |
| 508 | Web browser |
| 509 | Communication network |

-continued

| Reference Number | Description |
| --- | --- |
| 511 | Input devices |
| 512 | Output devices |
| 513 | RAM |
| 514 | ROM |

What is claimed is:

1. A method for counting plurality of objects placed in a region, the method comprising:

partitioning, by an object counting system, an image of the region, comprising the plurality of objects, into one or more segments based on depth of each of the plurality of objects, wherein the image of the region is received from an image capturing unit associated with the object counting system;

identifying, by the object counting system, one or more object regions in each of the one or more segments;

determining, by the object counting system, shape of each of the plurality of objects in each of the one or more object regions of each of the one or more segments, wherein determining the shape of each of the plurality of objects comprises:

obtaining spatial frequencies of each of the one or more object regions comprising the plurality of objects;

generating a magnitude spectrum histogram of the spatial frequencies of each of the one or more object regions; and associating a peak value of the magnitude spectrum histogram with a predetermined scaling factor for obtaining pixel coordinates corresponding to the plurality of objects, thereby determining the shape of the plurality of objects;

validating, by the object counting system, the shape of each of the plurality of objects based on comparison of the shape of each of the plurality of objects with predetermined shapes; and aggregating, by the object counting system, count of the plurality of objects of each shape in each of the one or more segments for determining count of the plurality of objects in the region.

2. The method as claimed in claim 1, wherein the depth of each of the plurality of objects in each of the one or more segments is determined using a depth sensor configured in the image capturing unit.

3. The method as claimed in claim 1, wherein the one or more object regions are identified in each of the one or more segments using a pre-trained machine learning classifier configured in the object counting system.

4. The method as claimed in claim 1, wherein validating the shape of each of the plurality of objects comprises:

assigning a probability score for the shape of each of the plurality of objects based on comparison of the shape of each of the plurality of objects with the predetermined shapes; and validating the shape of each of the plurality of objects when the probability score of the shape is higher than a threshold probability score.

5. The method as claimed in claim 1, further comprises eliminating overlap in the plurality of objects identified in the one or more object regions in each of the one or more segments by:

determining pixel indices corresponding to pixel area occupied by each of the plurality of objects in the one or more object regions;

identifying one or more overlapping objects upon detecting intersection among the pixel indices corresponding to one or more of the plurality of objects;

computing a Mutual Shape Co-occurrence Factor (MSCF) for each pair in the one or more overlapping objects based on an image gradient identified for each of the one or more overlapping objects; and selecting one object among each pair of the one or more overlapping objects for eliminating, when value of the MSCF, corresponding to the selected one object, is more than a predefined threshold MSCF.

6. An object counting system for counting plurality of objects placed in a region, the object counting system comprises:

a processor; and a memory, communicatively coupled to the processor, wherein the memory stores processor-executable instructions, which on execution cause the processor to:

partition an image of the region, comprising the plurality of objects, into one or more segments based on depth of each of the plurality of objects, wherein the image of the region is received from an image capturing unit associated with the object counting system;

identify one or more object regions in each of the one or more segments;

determine shape of each of the plurality of objects in each of the one or more object regions of each of the one or more segments, wherein to determine the shape of each of the plurality of objects, the processor is configured to:

obtain spatial frequencies of each of the one or more object regions comprising the plurality of objects;

generate a magnitude spectrum histogram of the spatial frequencies of each of the one or more object regions; and associate a peak value of the magnitude spectrum histogram with a predetermined scaling factor to obtain pixel coordinates corresponding to the plurality of objects;

validate the shape of each of the plurality of objects based on comparison of the shape of each of the plurality of objects with predetermined shapes; and aggregate count of the plurality of objects of each shape in each of the one or more segments to determine count of the plurality of objects in the region.

7. The object counting system as claimed in claim 6, wherein the processor determines the depth of each of the plurality of objects in each of the one or more segments using a depth sensor configured in the image capturing unit.

8. The object counting system as claimed in claim 6, wherein the processor identifies the one or more object regions in each of the one or more segments using a pre-trained machine learning classifier configured in the object counting system.

9. The object counting system as claimed in claim 6, wherein to validate the shape of each of the plurality of objects, the processor is configured to:

assign a probability score for the shape of each of the plurality of objects based on comparison of the shape of each of the plurality of objects with the predetermined shapes; and validate the shape of each of the plurality of objects when the probability score of the shape is higher than a threshold probability score.

10. The object counting system as claimed in claim 6, wherein to eliminate overlaps in the plurality of objects identified in the one or more object regions in each of the one or more segments, the processor is configured to:

determine pixel indices corresponding to pixel area occupied by each of the plurality of objects in the one or more object regions;

identify one or more overlapping objects upon detecting intersection among the pixel indices corresponding to one or more of the plurality of objects;

compute a Mutual Shape Co-occurrence Factor (MSCF) for each pair in the one or more overlapping objects based on an image gradient identified for each of the one or more overlapping objects; and select one object among each pair of the one or more overlapping objects to eliminate, when value of the MSCF, corresponding to the selected one object, is more than a predefined threshold MSCF.

11. A non-transitory computer readable medium including instructions stored thereon that when processed by at least one processor cause an object counting system to perform operations comprising:

partitioning an image of the region, comprising the plurality of objects, into one or more segments based on depth of each of the plurality of objects, wherein the image of the region is received from an image capturing unit associated with the object counting system;

identifying one or more object regions in each of the one or more segments;

determining shape of each of the plurality of objects in each of the one or more object regions of each of the one or more segments, wherein determining the shape of each of the plurality of objects comprises:

obtaining spatial frequencies of each of the one or more object regions comprising the plurality of objects;

generating a magnitude spectrum histogram of the spatial frequencies of each of the one or more object regions; and associating a peak value of the magnitude spectrum histogram with a predetermined scaling factor for obtaining pixel coordinates corresponding to the plurality of objects, thereby determining the shape of the plurality of objects;

validating the shape of each of the plurality of objects based on comparison of the shape of each of the plurality of objects with predetermined shapes; and aggregating count of the plurality of objects of each shape in each of the one or more segments for determining count of the plurality of objects in the region.

* * * * *